June 14, 1955 W. H. GILLE ET AL 2,710,730
AUTOMATIC STEERING MECHANISMS FOR AIRCRAFT
Filed Feb. 24, 1945
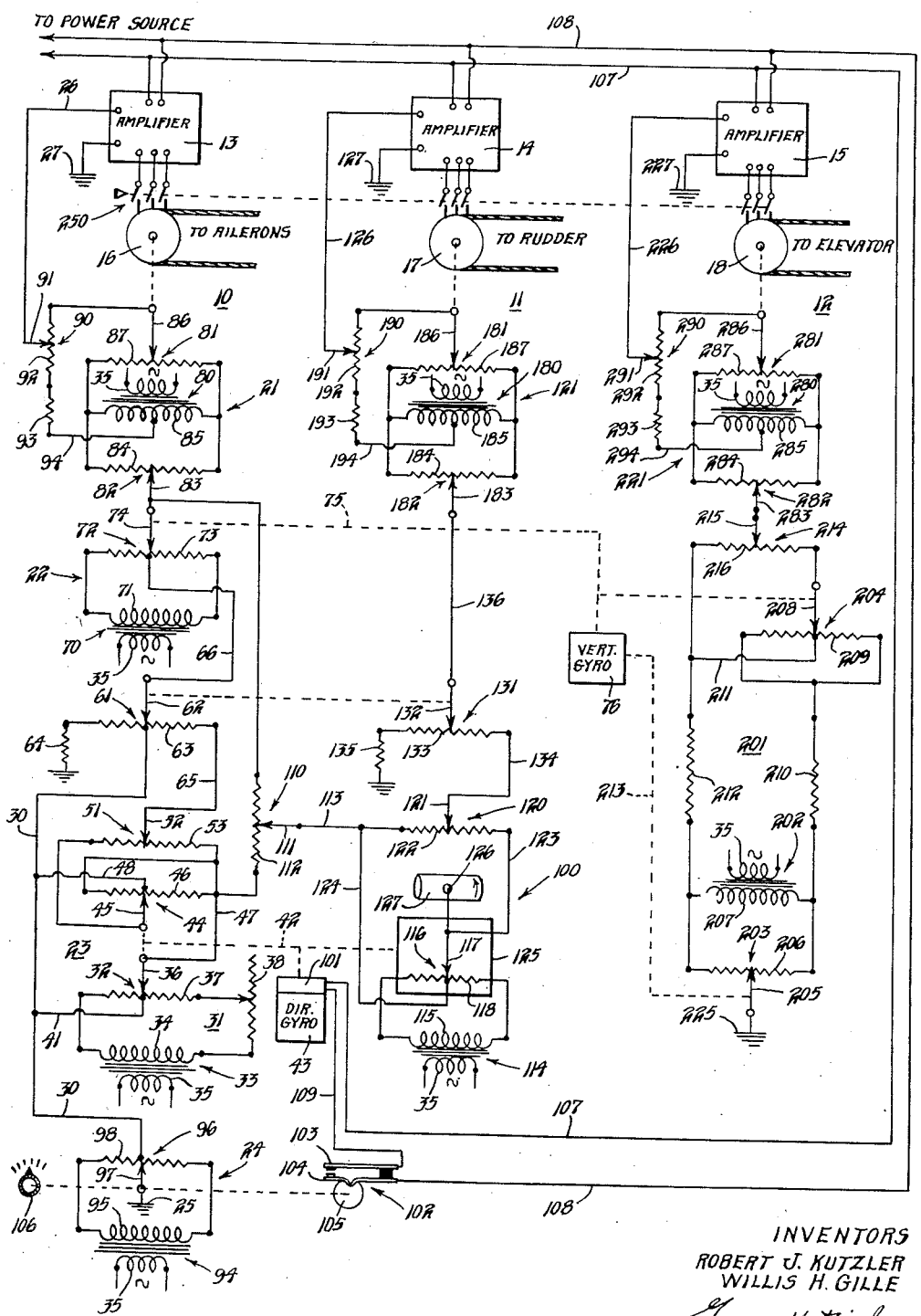
INVENTORS
ROBERT J. KUTZLER
WILLIS H. GILLE
BY George H. Fisher
ATTORNEY

United States Patent Office 2,710,730
Patented June 14, 1955

2,710,730

AUTOMATIC STEERING MECHANISMS FOR AIRCRAFT

Willis H. Gille, St. Paul, and Robert J. Kutzler, Minneapolis, Minn., assignors to Minneapolis-Honeywell Regulator Company, Minneapolis, Minn., a corporation of Delaware Application February 24, 1945, Serial No. 579,610

27 Claims. (Cl. 244—77)

Our invention relates generally to control systems and more particularly to control systems of the electrical type in which a number of condition responsive elements are connected together in a network so that their combined outputs may be used to control the operation of a member affecting these conditions. An example of such a control system is found in the automatic pilot used to control the flight of an aircraft so that the pilot's duties are greatly lessened while permitting him to regain control at any time should he so desire.

Electrically operated automatic pilots have been found to be very satisfactory and have provided the smoothest operation of an airplane that has yet been secured by an automatic pilot. However, the controls for such automatic pilots have often been somewhat complicated; and from the standpoint of passenger comfort, the automatic pilot has not provided so smooth a ride as may be provided by a human pilot.

It is therefore a major object of our invention to provide an automatic pilot which has simplified controls but which is nevertheless very quickly and easily adjusted to provide the response necessary for the individual ship in which it is installed.

It is another object of our invention to provide an automatic pilot which will produce a smoother flight with less discomfort to passengers than has heretofore been possible with automatic pilots.

It is still another object of our invention to provide a control system in which a signal is generated whose magnitude depends upon the rate of change of a condition and upon the direction of that change without regard for the amount of said change.

It is still another object of our invention to provide a control system wherein an exponential signal is furnished which is a function of the deviation of a condition and in which the exponential function may be of a first power, a second power, or any intermediate value therebetween.

It is a further object of our invention to provide a control system wherein the signals from several condition responsive elements in one network may be combined and used in another network to control the operation of a different member.

It is still a further object of our invention to provide a simple and effective means for controlling the amount of movement of a member in response to a given signal from the network controlling the operation of that member.

These and other objects of our invention will become apparent from the following description of a preferred form thereof and from the drawing illustrating that form in which the single figure shows a schematic diagram of a control system constructed in accordance with our invention and applied to the operation of the control surfaces of an airplane.

Before discussing the particular system, the problems of aircraft flight control will be discussed so that the operation of the system and the control functions will be better understood. In an airplane of the usual type, such as a monoplane having a single tail structure, an aileron is located in the trailing edge of each wing in the outer part thereof, and is mounted so that its trailing edge may be moved upwardly or downwardly into the airstream passing over or under the wing. The two ailerons are connected together, generally by cables, so that as one aileron moves up, the other moves down; and by controlling the position of the ailerons, the pilot is able to control the forces tending to lift one wing or the other and thus turn the ship about its longitudinal axis. In their neutral or streamlined position, the ailerons produce no force tending to roll the plane about its longitudinal axis, but any time they are deflected from their streamlined position, there is a force tending to roll the plane and the plane will generally continue to roll until the ailerons are streamlined.

The rudder of the plane acts in a manner generally similar to the rudder of a boat, and when in a neutral or streamlined position, aids in maintaining the boat or plane on its course. A deflection of the rudder to either side will cause the boat or plane to be turned in that general direction and the turning will continue until the rudder is again streamlined. The rudder is generally located at the rear or tail end of the aircraft, as is the elevator which, when moved from its streamlined position, causes the aircraft to climb or dive at an ever-increasing angle until the elevator is again streamlined, assuming that the air-speed remains constant. With each of these controls it is seen that the effect of moving one of them from its streamlined position tends to cause the aircraft to rotate about an axis and to tend to continue that rotation until the control is streamlined again.

A coordinated turn in an aircraft is one in which the resultant of the centrifugal force and gravitational force passes through the normal vertical axis of the airplane so that there is no sensation of turning if the ground or other reference point cannot be seen. To coordinate a turn, it is thus necessary that the plane be banked or turned about its roll axis an amount depending upon the speed of turning. To cause the plane to change its direction in azimuth and turn about a vertical axis, the rudder must be deflected and then maintained in a less deflected position as long as the turning is to continue. To bank the plane for a properly coordinated turn, the aileron must be deflected until the plane has acquired the proper degree of bank, at which time the ailerons must then be neutralized or streamlined in order to prevent continued rotation of the plane about its roll axis. To return the plane to straight and level flight, it is necessary that the rudder be returned to its streamlined position (and generally momentarily deflected in the opposite direction) while the ailerons are displaced in the opposite direction until the plane has been levelled, at which time they are again streamlined. The action of the control surfaces in general may be summed up by stating that the aircraft tends to continue to deviate from its former attitude or heading so long as the control surfaces are not in streamlined position. These effects must be taken into consideration in the design of an automatic pilot.

In addition to the effects of the control surfaces themselves, there are additional aerodynamic effects which must also be taken into consideration. When an airplane is flying, the lift produced by its wings is perpendicular to them; and thus when an airplane is flying with its wings level, all of the lift produced by them is vertical, and the vertical component of lift is equal to the total lift developed. However, when the plane is in a bank, the lift developed by the wings is at an angle to the vertical and hence while the total amount of lift developed by the wings remains constant, the vertical component is decreased and the plane thus tends to settle. For this reason, when a plane banks and makes a turn, it is necessary to apply a certain amount of "up elevator" in order that the plane may maintain its altitude even though otherwise it would still remain level.

Another condition is noted when it is attempted to make a turn using the rudder only and not using the ailerons. Under these circumstances, the wing nearer the center of the turn is traveling through the air at a lower speed than the outer wing, and hence the lift developed by the inner wing is less than that developed by the outer wing. This difference in lift will cause the plane to bank a certain amount, though the amount of bank thus produced generally will not be sufficient to provide a coordinated turn.

If the plane is banked by using the ailerons and the latter are then streamlined so that the plane remains in a bank, the lift produced by the wings, as previously explained, is directed at an angle to the vertical and the horizontal component of this lift tends to urge the plane in a horizontal direction toward the lower wing. This effect causes the plane to turn to a certain extent, but here again, the turn will not be coordinated. The amount of turning secured by banking the plane, and the amount of banking secured by turning the plane depend largely on the construction and design of the particular plane. Some planes are more responsive to the aileron than to the rudder and are known as "aileron ships"; while other planes are more sensitive to the rudder than to the aileron and hence are known as "rudder ships". All airplanes, however, have a certain amount of inter-relation between the different control surfaces as previously discussed, and it is for this reason that a properly designed automatic pilot which is to fly an airplane with precision must provide for this inter-relation in order to give satisfactory results.

In order to provide for the proper control surface action, means must be provided which will detect any deviation of the plane from level flight, and also detect any deviation of heading or turning of the plane in azimuth. Deviations from level flight may be detected by a gyroscope mounted with its spin axis vertical, and since a gyroscope tends to maintain its spin axis in the same direction at all times, any deviation of the plane about its longitudinal or roll axis, or any deviation about its transverse or pitch axis will be immediately indicated by relative movement between the rotor of the gyroscope and the frame of the plane. If a potentiometer is attached to the frame, and the wiper of the potentiometer is connected to the rotor of the gyroscope, the movement of the wiper over the potentiometer may be used to control the movement of the control surfaces. Similarly, an azimuth responsive instrument may be used to detect changes in the heading of the plane in azimuth, and to initiate the necessary corrections. The azimuth responsive may be a compass which is controlled by the earth's magnetic field, or may be directional gyroscoye or gyro compass. The particular form of the vertical gyroscope and the azimuth responsive instrument in and of themselves forms no part of our invention since such devices are well known in the art. The members controlled by these instruments, however, and the connections to those members form some of the features of our invention.

With the foregoing in mind, the advantages and operation of our control system will be more readily understood. Referring now to the drawing, the numeral 10 indicates a network adapted to control the ailerons of a plane, the numeral 11 indicates generally a network adapted to control a rudder of the plane, and the elevator of the plane is controlled by a network 12. The output of each of these networks is connected to its respective amplifier 13, 14, and 15, which in turn controls its respective servomotor 16, 17, and 18. The servomotor 16 is connected by cables to the aileron (not shown), the motor 17 is connected by cables to the rudder (not shown) and the motor 18 is connected to the elevator (not shown) so that each of these motors may position its associated control surface in accordance with the requirements of the corresponding network. The amplifiers and motors, as such, form no part of our invention and may be of any well known form, such as that shown in the patent to Anschutz-Kaempfe 1,586,233 or to Whitman 1,942,587.

Considering first network 10, it will be seen that the network consists of a series of bridges 21, 22, 23, and 24, with one of the output leads of bridge 24 grounded at 25, and one of the output leads of bridge 21 connected by conductor 26 to an input terminal of amplifier 13. The other input terminal of amplifier 13 is grounded at 27 and thus there is a completed circuit through network 10, to amplifier 13, to ground 27, ground 25, and back to network 10. Throughout this description, the voltage at different points will be mentioned and described, and in the absence of contrary words, the voltage is to be measured with respect to ground.

From bridge 24, a conductor 30 extends to network 23, and for the present this conductor may be considered as being grounded at bridge 24. Shown at the lower end of network 23 is a bridge 31 consisting of a potentiometer 32, a source of power such as a transformer 33, having a secondary winding 34 and a primary winding 35. Our system requires the use of several electrically isolated sources of power which may conveniently be secondaries of transformers, but since it is more convenient to use a single transformer with a plurality of secondaries, we have shown all the transformers used in our system as having the same primary and have designated it by the numeral 35, it being understood that individual transformers may be used if it is so desired. The primary winding 35 is connected to a suitable source of alternating current (not shown) such as the plane's inverter. The potentiometer 32 has a slider 36 which bears against a center tapped resistor 37, one end of which is connected through a variable resistor 38 to the secondary 34 while the other end thereof is connected directly to the secondary. The center tap of resistor 37 is connected by conductor 41 to conductor 30 and the wiper 36 is operated by a mechanical linkage 42 controlled by an azimuth responsive instrument 43 which may be a directional gyroscope. As the wiper 36 is moved from one side of the resistor 37 to the other, a voltage appears between it and conductor 30, this voltage being a maximum when the wiper is at one end of the resistor and linearly decreasing to zero as the wiper approaches the center tap and then linearly increasing but with a reversal of phase as the wiper approaches the other end of the resistor. This linear signal is hereinafter referred to as a first power signal. By adjusting the resistor 38, the voltage applied to the resistor 37 of potentiometer 32 may be varied in accordance with the demands of the system, and the maximum voltage developed between the center tap and the wiper 36 will thus be approximately half of the voltage applied to the resistor.

In many cases of precision flying, it has been found highly desirable to provide a signal which varies as the square of the deviation of the plane in azimuth instead of a signal which varies linearly with the deviation thereof. Hence in this control system we have provided means to produce a signal which varies as an exponential function of the deviation of the plane in azimuth, and this function may vary as a first, second, or intermediate power of the deviation. To do this, we have provided a center tapped potentiometer 44 having a wiper 45 which bears against a center tapped resistor 46 whose ends are electrically connected together and connected by conductor 47 to wiper 36 of the potentiometer 32. The center tap of resistor 46 is connected by conductor 48 to grounded conductor 30 and hence any voltage appearing between wiper 36 and conductor 30 is applied between the center tap of resistor 46 and the ends thereof. The amount of this voltage depends upon the position of the wiper 36 with respect to the center tap of resistor 37. The voltage appearing between wiper 45 and conductor 30 will thus depend upon both the position of wiper 45 and the position of wiper 36; and if these two wipers are mechanically connected together so that they move in synchronism, it may be shown that this voltage is a second power function of the movement of the wipers, i. e., the voltage varies as the square of the movement thereof. This signal is hereinafter referred to as a second power signal.

To provide means for selecting the desired exponential function of the signal produced by the potentiometers 32 and 44, we provide a third potentiometer 51 having a wiper 52 and a resistor 53, one end of which is connected to conductor 47 and the other end of which is connected to wiper 45 of potentiometer 44. When wiper 52 is at the right-hand end of resistor 53, as shown in the drawing, it is directly connected to slider 36 through conductor 47 so that the voltage between wiper 52 and conductor 30 is the same as the voltage between wiper 36 and conductor 30, and hence the output of network 23 is a signal varying linearly with the displacement of wipers 36 and 45. Similarly, when wiper 52 is moved to the left end of resistor 53, wiper 52 is connected directly to slider 45 so that the voltage developed between wiper 52 and conductor 30 is the same as that developed between wiper 45 and conductor 30, and hence the signal developed by network 23 varies as the square of the displacement of the wipers 36 and 45. At intermediate positions of the wiper 52 a signal will be produced by network 23 which is an exponential function of the displacement of the wipers 36 and 45, the power of this function being intermediate between plus 1 and plus 2, corresponding to the limits obtainable when the wiper 52 is at the extreme ends of the resistor 53.

For purposes to be described later, it is sometimes desirable to reduce the effect of the azimuth responsive instrument upon the system, and consequently we have provided what we term a master ratio potentiometer 61 having a wiper 62 adapted to bear against a center tapped resistor 63. One end of resistor 63 is connected by a fixed resistor 64 to ground, while the other end is connected by conductor 65 to wiper 52 of potentiometer 51. Conductor 30 is connected to the center tap of resistor 63, and thus by varying the wiper 62 between the center tap and the right-hand end of resistor 63, any desired portion of the signal from network 23 may be secured.

From wiper 62, a conductor 66 makes connection to bridge 22. This bridge consists of a transformer 70 having a primary winding 35 and a secondary winding 71 which is connected to the ends of a resistor 72 of a gyroscopically operated potentiometer 73. A wiper 74 bears against the resistor 72 and is moved thereacross by a linkage 75 connected to a vertical gyroscope 76. Conductor 66 is connected to the center tap of resistor 72 and a voltage will thus appear between wiper 74 and conductor 66 whenever the wiper is displaced from its center position. The linkage 75 and vertical gyroscope 76 are arranged so that as the plane rolls or banks about its longitudinal axis wiper 74 will be moved with respect to resistor 72. The voltage developed between wiper 74 and conductor 66 will be a maximum when the wiper is at one end of resistor 72 and will decrease linearly as the wiper is moved toward the center tap where the phase of the voltage will be reversed and the magnitude thereof will then increase until the opposite end of the resistor is reached.

From wiper 74 connection is made to bridge circuit 21 which includes a source of power such as a transformer 80, a rebalancing potentiometer 81, and a centering potentiometer 82. Centering potentiometer 82 has a wiper 83 which bears against a resistor 84, the ends of which are connected across a secondary 85 of the transformer 80. Similarly, potentiometer 81 has a wiper 86 which bears against a resistor 87 likewise connected across the terminals of secondary 85, and the resistors 84 and 87 are thus in parallel.

Wiper 86 of rebalancing potentiometer 81 is operated by the aileron servomotor 16 and is so connected that for any given position of the ailerons, there is a corresponding position of the wiper 86; thus, when the ailerons are in streamlined position, the wiper 86 is substantially at the mid-point of its travel over resistor 87. Wiper 83 is manually controllable and is used in a manner later described to select a suitable position for the ailerons, which may or may not be in streamlined position, while the system is in operation. If wiper 86 is in the same position with respect to resistor 81 as wiper 83 is with respect to resistor 84, there will be no potential difference between the wipers 83 and 86; but if the wipers are not in the same relative position a potential difference will appear between them in the manner of the well-known Wheatstone bridge.

However, under certain conditions it is desirable for wiper 86 to move a greater distance along resistor 87, corresponding to a greater movement of the ailerons for a given displacement of wiper 83, 74, or 45 and 36 along their respective resistors. To effect this variation, we provide a ratio trimmer potentiometer 90 having a wiper 91 which bears against a resistor 92. One end of resistor 92 is connected to wiper 86, while the other end is connected through fixed resistor 93 and conductor 94 to the center tap of the secondary winding 85 of transformer 80. When wiper 86 is in the mid-point of its travel on resistor 87, no voltage will appear between the wiper and the center tap of transformer secondary 85, and hence no voltage will appear across the resistors 92 and 93. However, if wiper 86 is displaced from its center position, a voltage will appear between it and the conductor 94, and in the manner of the well-known voltage divider, a portion of this voltage will appear between wiper 91 and conductor 94. If wiper 91 is at the upper end of resistor 92, the entire voltage appearing between wiper 86 and conductor 94 will appear between wiper 91 and the conductor, while if wiper 91 is at the lower end of resistor 92, a greatly reduced portion of this voltage will appear between wiper 91 and the conductor. Resistor 93 is included in the circuit so that it will be impossible to position wiper 91 so that none of the voltage appearing between the wiper 86 and conductor 94 will appear at wiper 91. If this occurred, the rebalancing potentiometer 81 would have no effect.

The position of wiper 91 of the ratio trimmer potentiometer 90 has no effect upon the voltage appearing between it and the wiper 83 of the centering potentiometer 82. This will be seen when it is remembered that for any given setting of the wiper 86 of the rebalancing potentiometer 81, movement of the wiper 83 changes the potential difference between the latter and the conductor 94, and likewise changes by an equal amount the voltage between wiper 83 and wiper 86. Thus the entire voltage signal caused by the movement of wiper 83 will appear at both ends of resistors 92 and 93, and hence movement of wiper 91 will not affect the voltage appearing between it and the wiper 83 because of movement of the latter wiper.

To complete the network 10, wiper 83 of the centering potentiometer 82 is connected to wiper 74 of the gyroscopically operated potentiometer 72 and wiper 91 is connected by conductor 26 to amplifier 13.

Considering now the network which has thus far been described, and assuming conductor 30 to be at ground potential, a first power signal is developed between wiper 36 of potentiometer 32 and ground; this first power signal is modified by potentiometer 44 so that a second power signal appears between its wiper 45 and ground; and a signal whose exponential power may be between plus one and plus two appears between wiper 52 and ground. This signal, which is a function of the deviation of the plane in azimuth, is applied to master ratio control potentiometer 61; and the desired portion of this signal is selected by the position of wiper 62 so that there may be a directional signal appearing between that wiper and ground. Bridge 22, with its gyroscopically operated potentiometer 72, then raises or lowers this signal value by adding a signal determined by the position of wiper 74 on resistor 73; and the magnitude of the signal may then be further modified by the action of bridge 21 in a manner similar to that previously described. The voltage thus appearing between wiper 91 and ground is supplied by conductor 26 and ground 27 to amplifier 13 which controls the operation of the servomotor 16 accordingly, as will be more fully described later.

In an earlier part of the description, it was noted that when the plane banks or rolls about its longitudinal axis, there is a corresponding tendency for it to turn in azimuth; and similarly when the plane turns in azimuth, there is a corresponding tendency for it to roll about its longitudinal axis. Means responsive to both of such types of deviations have been provided in the aileron network 10 by the gyroscopically operated potentiometer 72 and by the potentiometers operated by the azimuth responsive member 43. Signals very similar to these are desired for controlling the operation of the rudder, save that a linear rather than an exponential signal is desired from the azimuth responsive instrument, and a velocity signal, hereinafter described, is also desired. Since the desired signals are present in the aileron network 10, we have used them in the rudder network 11 also, thereby decreasing the number of potentiometers which must be operated by the vertical gyroscope 76. The rudder network 11 is thus considerably different from the aileron network 10. While the rudder network has a bridge circuit 121 corresponding to bridge 21 of the aileron network, the similarity does not continue further, for between the bridge 121 and the aileron network 10, a bridge 100 is interposed whose purpose is to provide a velocity signal for the rudder.

To furnish the desired signal from the aileron network 10, we have provided a "skid" potentiometer 110 having a wiper 111 which bears against a resistor 112. One end of resistor 112 is connected to wiper 74 of gyroscopically operated potentiometer 72 and the other end of resistor 112 is connected to conductor 47 which connects to wiper 36 of potentiometer 32. Thus the lower end of resistor 112 will have a signal impressed upon it which varies linearly with the deviation of the plane in azimuth, and the upper end of the resistor will have a signal impressed upon it which varies with the roll of the plane about its longitudinal axis. Therefore, when wiper 111 is at the lower end of resistor 112, the voltage between this wiper and ground will vary almost solely with the deviation of the plane in azimuth, while if the wiper is at the upper end of the resistor, the voltage will vary with the roll of the plane about its longitudinal axis and with the deviation of the plane in azimuth. At an intermediate position the voltage will be a combination of the two. This voltage signal may be termed a deviation signal. From wiper 111, a conductor 113 leads to bridge 100, wherein we provide a signal whose magnitude depends only upon the rate of deviation of the plane in azimuth.

Several methods are available for providing a rate or velocity signal, but the one we have shown is very simple and works very well with the equipment already present in the system. Electrically, bridge 100 includes a transformer 114 having a primary winding 35 and a secondary winding 115. A potentiometer 116 has a wiper 117 which bears against a center tapped resistor 118, the ends of which are connected to the terminals of the secondary 115. When wiper 117 is displaced from the center, a voltage will appear between it and the center tap of resistor 118, the voltage varying from a maximum at one end to zero at the position of the center tap and to maximum at the other end, with a reversal of phase at the center tap as has been previously described. The velocity signal control potentiometer 120 has a wiper 121 which bears against a resistor 122. One end of resistor 122 is connected by conductor 123 to wiper 117, and the opposite end of the resistor is connected through conductor 124 to the center tap of resistor 118. Conductor 113 is likewise connected to conductor 124; and by an analysis similar to that previously given, it will be seen that as to the deviation and velocity signals appearing at wiper 121, the position of the wiper determines the amount of velocity signal appearing between it and ground, while the deviation signal from wiper 111 is not affected by the position of wiper 121.

To provide the necessary mechanical movement of the wiper 117 with respect to resistor 118, wiper 117 is pivotally mounted on a block 125 on which the resistor 118 is likewise mounted. An extension to the wiper 117 extends beyond the edge of the block 125 and carries a small roller 126 on the end thereof. The roller 126 continuously bears against a rotating cylinder 127 and the roller and cylinder are preferably made of such material that slipping of the roller along the cylinder in a direction parallel to the latter's axis is reduced to a minimum. The rotation of the cylinder 127 thus causes the roller 126 to be rotated; and so long as the axis of rotation of the roller 126 is parallel to that of the cylinder 127, there is no force developed between the two tending to cause movement of the roller along the cylinder. However, if the axis of the roller 126 is not parallel to that of the cylinder 127, the rotation of the latter tends to cause the roller to move along the cylinder until the two axes are parallel, the point of contact of the roller and cylinder tracing a curve on the cylinder known as a tractrix. Hence if the block 125 is moved to the right, the roller 126 will tend to lag behind the movement of the block and thus cause the lower end of the wiper 117 to be moved along resistor 118 to the right. This will destroy the parallel relationship between the axis of the roller 126 and the cylinder 127, and the rotation of the latter will then cause the roller to be moved toward the right until the parallel relationship is restored, at which time wiper 117 will be aligned with the center tap of resistor 118. The amount by which the roller 126 lags behind the movement of the block 125 and the speed of recovery of the roller will depend upon the speed of rotation of the cylinder 127 and the rate at which the block 125 is moved sideways. By a choice of suitable values, however, it is possible to construct this velocity signal apparatus so that the movement of the wiper 117 from the mid-point of the resistor 118 is substantially proportional to the rate of movement of the block 125. The block 125 is operated by linkage 42 of the azimuth responsive instrument 43 so that a signal proportional to the rate of change of direction in azimuth will appear across conductors 123 and 124, and the desired portion of this signal may be selected by wiper 121 of potentiometer 120. The design of the velocity signal device just described is the subject of an application of George L. Borell and Daniel G. Taylor S. N. 579,586 for Letters Patent, filed February 24, 1945, now U. S. Patent No. 2,476,276, issued on July 19, 1949.

A second master ratio control potentiometer 131 has a wiper 132 bearing against a resistor 133; and the wiper of the aileron master ratio control 61 and the rudder master ratio control 131 are mechanically connected together so that the wipers move simultaneously over their corresponding resistors. Wiper 121 of potentiometer 120 is connected to one end resistor 131 by conductor 134, and the other end of the resistor is connected through a fixed resistor 135 to ground. The deviation signal from the network 10, together with that portion of the velocity signal which has been selected by the wiper 121 of potentiometer 120 thus appear between conductor 134 and ground. If wiper 132 is at the right-hand end of resistor 133, this entire signal may be measured between wiper 132 and ground, while if the wiper is moved to the left a smaller portion of the signal appears until, if the wiper were placed at ground potential, there would be no signal appearing. To prevent this latter condition, resistor 135 is connected between the left-hand end of resistor 133 and ground, and thus the signal present in wiper 132 may be greatly decreased but not completely reduced to zero.

Completing rudder network 11 is bridge 121, similar in all respects to bridge 21 and having a source of power such as a transformer 180, a rebalancing potentiometer 181 and a centering potentiometer 182. Transformer 180 has a primary 35 and a center tapped secondary 185, and centering potentiometer 182 has a wiper 183 which bears agaisnt a resistor 184, the resistor being connected to the secondary 185. The rebalancing potentiometer 181 includes a wiper 186 which bears against a resistor 187 and this resistor is likewise connected to the secondary 185. A ratio trimmer potentiometer 190 has a wiper 191 which bears against a resistor 192 and one end of this resistor is connected to wiper 186 of the rebalancing potentiometer 181, while the other end is connected through fixed resistor 193 and conductor 194 to the center tap of the secondary 185. The operation of bridge 121 is the same as that of bridge 21, and connection is made by conductor 136 from wiper 183 of the centering potentiometer 182 to wiper 132 of the rudder master ratio controller 131. From wiper 191 of the ratio trimmer potentiometer 190, connection is made by conductor 126 to one of the input terminals of amplifier 14, while the other terminal thereof is grounded at 127.

A complete signal voltage circuit for the amplifier 14 may now be traced. Starting at ground 25 in bridge 24, conductor 30 may be considered to be at ground potential, and a voltage signal is developed between it and wiper 36 of potentiometer 32 when the wiper is displaced from the center tap of its associated resistor 37. This voltage is transmitted by conductor 47 to the lower end of resistor 112 of the "skid" potentiometer 110. Similarly, conductor 66 which leads from wiper 62 of aileron master ratio control potentiometer 61 is, as previously described, above ground potential, and wiper 74 of gyroscopically operated potentiometer 72 is further raised above this potential whenever it is displaced from the center tap of resistor 73 to which conductor 66 is connected. From wiper 74 connection is made to the upper end of resistor 112 of potentiometer 110, and there thus appears between wiper 111 and ground a signal having components therein of the two signals which appear at the opposite ends of resistor 112. The velocity signal appearing between conductor 113 and wiper 121 of potentiometer 120 is added to the deviation signal present in conductor 113, and the combined signal is transmitted by conductor 134 to the right-hand end of resistor 133 of the rudder master ratio control potentiometer 131. As previously explained, whenever a deviation or velocity signal is present, wiper 132 of the rudder master ratio control potentiometer 131 must be above ground potential, and this voltage is transmitted by conductor 136 to bridge 121 where a further voltage signal may be introduced by the position of wipers 183, 186, and 191 of the potentiometers 182, 181, and 190. The sum of all the various signals is transmitted by conductor 126 to amplifier 14 and then to grounds 127 and 25, thus completing the circuit.

It will be seen that heretofore we have described a system for maintaining a plane in a level attitude upon a predetermined course; but to provide a complete autopilot, it is necessary to provide easily operable means for changing the direction of the plane in azimuth. To this end we have provided bridge 24. Bridge 24 includes a transformer 94 having a primary winding 35 and a secondary winding 95, and a potentiometer 96 having a wiper 97 and a center tapped resistor 98 connected across the secondary 95. The center tap of resistor 98 is connected to conductor 30 and the wiper 97 is grounded at 25 so that movement of the wiper 97 away from the center tap of the resistor will cause a voltage to appear between conductor 30 and ground. This voltage will also appear between the center tap of resistor 63 of the aileron master ratio control potentiometer 61 and ground. Because of resistor 64, wiper 62 cannot be at ground potential unless the center tap of resistor 63 is, and hence a portion or all of the voltage appearing at the center tap of resistor 63 will appear at wiper 62 and be transmitted to the gyroscopically operated potentiometer 72. Thus the potential of wiper 74 of the gyroscopically operated potentiometer 72 will be raised, as will wiper 36 of potentiometer 32, so that both ends of resistor 112 of "skid" potentiometer 110 will have this higher voltage impressed upon them which will be transmitted through conductor 113 to the rudder network 11. This voltage will pass through potentiometer 120, conductor 134, to rudder master ratio control potentiometer 131 where a portion of it will appear on wiper 132 from whence it will go through bridge 121 and then through conductor 126 to amplifier 14. Here the voltage will operate the amplifier to cause it to drive the servomotor 17 to move the rudder away from streamlined position.

Similarly, the increased voltage which appears at wiper 74 of the gyroscopically operated potentiometer 72, caused by the displacement of wiper 97 from the midpoint of resistor 98 and bridge 24, will cause an increased voltage to be transmitted through bridge 21 and conductor 26 to amplifier 13. There it will cause the amplifier to operate servomotor 16 and move the ailerons to a position away from streamline. By properly phasing the various transformer secondaries and by suitably connecting the servomotors 16 and 17, it is possible to connect the system so that movement of wiper 97 to the right will cause the rudder to be driven to the right and at the same time the ailerons will be positioned so as to produce a right bank of the plane. Under these conditions, the plane will bank and turn toward the right, and will continue in that bank and turn until the wiper 97 is returned to its center position.

The movement of wiper 97 of the turn control potentiometer 96 from its center position has caused a voltage signal to appear in both network 10 and network 11. This causes the ailerons and the rudder, respectively, to be moved; and the movement will continue until the voltage of the respective network is zero, that is, until the voltage as measured between the conductor 26 and ground, and between conductor 126 and ground is zero. As soon as the voltage of the network reaches zero, movement of the control surface ceases. The complete operation of the system will be described later, but it will be apparent at this time that when a turn is being made by means of the turn control potentiometer 96 it is desirable that the azimuth responsive instrument 43 no longer controls its associated potentiometers 32, 44, and 117. If these potentiometers were controlled by the azimuth responsive instrument 43, the banked turn produced by the turn control potentiometer 96 would be detected by the azimuth responsive instrument and the latter would introduce a "correcting" signal into the networks, this "correcting" signal opposing the desired signal from the turn control potentiometer 96. As a result, the effectiveness of the latter control would be greatly reduced. To render the azimuth responsive instrument 43 inoperative when the turn control wiper 97 is moved from center position, we provide a means 101 interposed between the azimuth responsive instrument and the linkage 42. The means 101 either takes the form of a disconnecting means such as a clutch, or a locking means which will lock the linkage in position while the linkage slips with respect to the azimuth responsive instrument 43. For convenience, the means 101 will hereafter be referred to as locking means, and to operate it, we prefer to provide a cam operated switch 102 having a pair of switch blades 103 and 104 which are moved together to complete a circuit by rotation of a cam 105 which is controlled by a knob 106 which also moves the wiper 97 of the turn controlled potentiometer 96. Switch 102 is connected in series with the locking means 101 and with a source of power (not shown) by conductors 107, 108, and 109. This same source of power may also be used to provide power for the amplifiers 13, 14, and 15, and is so shown in the drawing.

The elevator network 12 consists of a bridge 221, similar to bridges 21 and 121, and a second bridge 201. Bridge 201 includes a transformer 202, an elevator potentiometer 203, and an up-elevator potentiometer 204. Elevator potentiometer 203 includes a wiper 205 which bears against a resistor 206, and transformer 202 has a primary 35 and a secondary 207, the terminals of the latter being connected to the terminals of the resistor 206. Up-elevator potentiometer 204 has a wiper 208 which bears against a center tapped resistor 209, the ends of which are connected together and through a fixed resistor 210 to one end of the secondary 207. The center tap of resistor 209 is connected by conductor 211 through a resistor 212 to the opposite end of secondary 207. Wiper 208 of the up-elevator potentiometer 204 is operated by the linkage 75 which is controlled by the vertical gyroscope 76. The linkage 75 and gyroscope 76 are arranged so that any roll of the plane about its longitudinal axis will cause wiper 74 to move across resistor 73 of gyroscopically operated potentiometer 72, and also cause wiper 208 to move across resistor 209 of the up-elevator potentiometer 204. Deviation of the aircraft about its pitch axis alone has no effect on the linkage 75 or its associated wipers. However, to provide a correction for the deviation of the craft about its pitch axis, we connect a linkage 213 to the vertical gyroscope 76 and to wiper 205 of the elevator potentiometer 203 so that the wiper is moved with respect to resistor 206 whenever there is a deviation of the plane about its pitch axis.

In general, the value of resistance 212 is chosen so that it is approximately equal to the sum of the resistance of resistor 210 plus ¼ of the total resistance of the resistor 209; and because of the series-parallel circuit connecting resistors 209 and 210, it will be seen that conductor 211 is at the electrical mid-point of the upper portion of the bridge. Wiper 205 of elevator potentiometer 203 is grounded at 225; and since conductor 211 is at the mid-point of the upper portion of the bridge, there will be no voltage developed between it and ground when wiper 205 is at the center point of resistor 206. Any deviation of the wiper 205 from its mid-position will cause a voltage to appear between conductor 211 and ground, as is customary in all such Wheatstone bridge circuits.

Since each half of resistor 209 of up-elevator potentiometer 204 is connected in series with conductor 211 and resistor 210, there is a potential difference between the center tap of the resistor 211 and the ends thereof; and any movement of wiper 208 away from the center tap will cause a voltage to appear between the wiper and conductor 211. Since the ends of resistor 209 are connected together, it will be apparent that any movement of the wiper 208 away from center in either direction will cause a voltage to appear which will increase as the wiper approaches the end of the resistor, but there will be no phase shift as the wiper returns from one side of center, passes the center tap, and then moves to the other side. As previously mentioned, it is desirable to apply a certain amount of "up elevator" to the plane whenever it is banked, and since wiper 208 is operated by the vertical gyro whenever there is any roll of the plane about its longitudinal axis, it will thus be seen that we have provided a signal which appears whenever the plane rolls about its longitudinal axis but which always has the same phase or direction no matter to which side the plane is banked.

To provide means for varying the amount of signal which is to be used for a given degree of bank, we provide an up-elevator compensation potentiometer 214 having a wiper 215 which bears against a resistor 216. One end of resistor 216 is connected to conductor 211 and the other end thereof is connected to wiper 208 and any voltage thus developed between wiper 208 and conductor 211 will be impressed across the end of resistor 216, and by varying the position of wiper 215, any desired portion of this signal may be selected. Thus when wiper 215 is at the left end of resistor 216, none of the up-elevator signal appears at wiper 215; while if the wiper is at the right-hand end, the entire up-elevator signal appears thereon. The position of wiper 215 has no effect upon the voltage signal developed by wiper 205 of the elevator potentiometer 203, since the effect of the latter wiper is to shift the position of ground potential within the bridge 201, and the effect of wiper 215 is to select a desired portion of a signal generated within the network.

Completing network 12 is bridge 221 which is similar in all respects to bridges 21 and 121 which have previously been described. Bridge 221 includes a source of power such as a transformer 280 having a primary 35 and a center-tapped secondary 285, a rebalancing potentiometer 281, and a centering potentiometer 282. The centering potentiometer 282 has a wiper 283 which bears against resistor 284, and rebalancing potentiometer 281 has a wiper 286 which bears against resistor 287. Resistors 284 and 287 are connected in parallel with each other and with the secondary 285. A ratio trimmer potentiometer 290, having a wiper 291 which bears against resistor 292, has one end of the resistor connected to wiper 286 of the rebalancing potentiometer and the other end connected through fixed resistor 293 and conductor 294 to the center tap of the secondary 285. The operation of the bridge 221 is exactly the same as has already been described in connection with bridge 21 and will not be repeated here. Wiper 283 of centering potentiometer 282 is connected to wiper 215 of the up-elevator compensation potentiometer 214. Wiper 291 of the ratio trimmer potentiometer 290 is connected by means of conductor 226 to one of the input terminals of amplifier 15 and the other terminal thereof is grounded at 227.

A voltage circuit may now be traced for the elevator network 12. Starting at ground 225, wiper 205 is also at ground potential, and if it is at the mid-point of its resistor 206, conductor 211 will likewise be at ground potential since it is at the midpoint of the upper half of the bridge 201. However, if wiper 205 is displaced from its center position, conductor 211 will be at some voltage above ground, the voltage being a maximum when the wiper 205 is at one end of resistor 206 and decreasing to zero as the wiper approaches its mid-point and then increasing but with a reversal of phase as the wiper approaches the other end of resistor 206.

In addition, a voltage may appear between wiper 208 of up-elevator potentiometer 204 and conductor 211. The combined voltage, with respect to ground, caused by the position of wipers 205 and 208 will appear at the right-hand end of resistor 216 of up-elevator compensation potentiometer 214, while the voltage, with respect to ground, caused by the position of wiper 205 alone will appear at the left-hand end of resistor 216. The full voltage caused by the position of wiper 205 will thus always appear at wiper 215 of potentiometer 214, while only the desired portion of the voltage from the up-elevator potentiometer 204 will also appear thereon.

In bridge 221, a voltage may be added by reason of the position of wiper 283 of centering potentiometer 282 with respect to the mid-point of resistor 281. This voltage, together with the desired portion of the voltage appearing between wiper 286 of the rebalancing potentiometer 281 and conductor 294 will appear on the wiper 291 of the ratio trimmer potentiometer 290. From wiper 291, the voltage is transmitted by conductor 226 to the amplifier 215 from which it returns to ground at 227 and back to ground 225.

In the construction of an actual system, we prefer to reduce to a minimum the number of controls which are to be adjusted by the pilot. The remaining controls should be located so that they will be accessible during flight, but not so conveniently located as to make them a temptation for constant adjustment by crew members. The rebalancing potentiometers 81, 181, and 281 are conveniently made a part of the servomotors 16, 17, and 18, respectively; and the gyroscopically operated potentiometer 72, the elevator potentiometer 203 and the up-elevator potentiometer 204 may be conveniently mounted within the housing of the vertical gyroscope 76. The potentiometer 32, the second order potentiometer 44, and the velocity potentiometer 116 are preferably mounted within the housing of the azimuth responsive instrument 43 or within a case attached thereto.

Many of the remainder of the controls may be properly set once, according to the flying characteristics of the particular aircraft, and then left alone; and these controls we have grouped together and mounted in an accessible but out-of-the-way location. These controls include the ratio trimmer potentiometers 90, 190, and 290, the exponential signal calibration potentiometer 51, the so-called "skid" potentiometer 110 and the variable resistor 38. These potentiometers we have preferably furnished with screw driver adjustment so that although a restless crew member may discover them, unless he is provided with a screw driver, he will be unable to change the setting and thus destroy the proper operation of the system.

The remainder of the controls are ones which it now seems advisable to have under the control of the pilot, and we have mounted the centering potentiometers 82, 182, and 282, the up-elevator compensating potentiometer 214, the master ratio control potentiometers 61 and 131, the velocity signal adjustment potentiometer 120, and the turn control potentiometer 96 on the pilot's control panel for the automatic pilot.

*Operation*

Let it now be assumed that the aircraft is flying, the various transformer secondaries have been energized, the azimuth responsive instrument 43, if gyroscopically operated, and the vertical gyroscope 76 have been energized so that they are acquiring a spatial rigidity, and that amplifiers 13, 14, and 15 have also been energized. The pilot should then manually trim the aircraft so that the control surfaces tend to assume a position which will maintain the flight of the craft in the desired attitude and heading. Assuming for purposes of illustration that the desired path is level flight in a due north direction, when the plane is flying in the desired manner, the vertical gyroscope 76 will center the wiper 74 of the gyroscopically operated potentiometer 72, and likewise center wiper 205 of up-elevator potentiometer 204 and wiper 205 of elevator potentiometer 203. At the same time, wipers 36, 45, and 117 of the potentiometers 32, 44, and 116, respectively, operated by the azimuth responsive instrument 43, should be centered either manually or by some suitable mechanical means (not shown). The turn control potentiometer 96 should be checked to see that its wiper 97 is in its mid-position, a task which will be quite easy since the cam 105 and switch blade 104 of the cam operated switch 102 cooperate to act as a detent mechanism indicating when the control wiper is centered.

All necessary potentiometers have now been centered; and with the aircraft properly trimmed, the position of the wipers 86, 186, and 236 of the rebalancing potentiometers 81, 181, and 281 is determined by the position of the control surfaces themselves. It is desirable to have the control system adjusted so that while the plane remains in its same attitude and heading, the control surfaces will retain their same position. Any deviation of the plane about its roll, pitch, or turn axis will then cause a signal to be developed which will cause movement of the proper control surface to correct this deviation. It is thus necessary to balance the system so that for the given flight conditions and for the given control surface positions, the entire bridge system 10, 11, and 12 will be in a balanced condition and conductors 26, 126, and 226, will be at ground potential. To do this, the pilot individually adjusts the wipers 83, 183, and 283 of centering potentiometers 82, 182, and 282 until the voltage signal to the respective amplifiers is zero. This condition may be indicated by a voltmeter connected across the input terminals of the amplifiers, or lights connected across the output terminals thereof, or any other suitable means. When the three networks 10, 11, and 12 are thus balanced, the servo motors 16, 17, and 18 are placed in operative condition by connecting them to their respective amplifiers by means such as a switch 250, or any other suitable means which may be desired. The wipers 36, 45, and 117 of potentiometers 32, 44, and 116 are then released and connected to the azimuth responsive instrument 43, and the plane is then flying under the control of the automatic pilot.

Assume now that the plane is flying due north and in a level attitude when, because of some air current, the right wing suddenly dips. When this happens, wiper 74 may be assumed to be moved to the left, across resistor 73 of the gyroscopically operated potentiometer 72, and a signal will appear between the center tap of resistor 73 and wiper 74. This signal is transmitted through bridge 21 and conductor 26 to the amplifier 13 which then operates servomotor 16 so as to drive the right aileron downwardly and the left aileron upwardly (this is known as left aileron), and the plane starts to turn to its original attitude. The operation of the servomotor 16, however, will cause movement of wiper 86 of the rebalancing potentiometer 81, and the wiper is so connected to the motor that a condition of left aileron causes the wiper to be moved to the right of the center point of resistor 87. The voltage developed between wiper 86 and conductor 94 will be in such a direction as to oppose the voltage developed by the gyroscopically operated potentiometer 72; and the operation of the servomotor will continue until that portion of the rebalancing voltage which appears between wiper 91 and conductor 94 is equal to the signal developed by the bridge 22. At this point, the operation of motor 16 will cease; but since the action of the ailerons continues, the plane will continue to turn about its longitudinal axis, but turning to the left toward its original position. When this occurs, the wiper 74 of gyroscopically operated potentiometer 72 is returned toward its center position, and the signal thereby generated in bridge 22 is thus constantly decreasing. As a result, what was originally a balancing signal occurring between wiper 86 and conductor 94, is now the larger signal; but its phase is reversed from that of the signal of bridge 22. This phase reversal causes the amplifier to drive motor 16 in the opposite direction and thus the ailerons are returned to their streamlined position. The result of this action has been to cause the ailerons to be moved so as to produce a left bank, and then as the aircraft approached a level position, the ailerons were streamlined. The action is thus the same as that which would have been done by a human pilot, with the exception that the automatic pilot has detected the deviation and started to apply corrective measures sooner than a human pilot can respond to the indication of the flight instruments and cause his muscles to operate the aileron control.

As previously mentioned, when the craft has rolled about its longitudinal axis, the horizontal component of the lift tends to turn the plane; and hence while one wing is low, a certain amount of rudder must be applied in the opposite direction to keep the craft on its same heading. We have explained earlier that the signal which appears between the center tap of resistor 73 of the gyroscopically operated potentiometer 72 and the wiper 74 thereof, also appears at the upper end of resistor 112 of the potentiometer 110 and is transmitted to the rudder network 11 by conductor 113.

The signal present in conductor 113 is transmitted through conductor 134 and rudder master ratio controller 131, through bridge 121, and conductor 126 to amplifier 14 where it causes the latter to operate the servomotor 17 to move the rudder to the left. When this occurs, wiper 186 of the rebalancing potentiometer 181 is moved to the right and an opposing signal is thus generated in bridge 121 which balances out the signal from the gyroscopically operated potentiometer 72. The servomotor 17 thus stops; and as the wiper 74 of the gyroscopically operated potentiometer 72 returns to its center position, the rudder is returned to streamline position, in the same manner as the ailerons previously described.

It will be remembered that when the plane has rolled about its longitudinal axis, the vertical component of lift produced by its wings is reduced, and a certain amount of "up-elevator" must be applied in order to maintain the plane at the same altitude. In order to provide for this elevator movement under these conditions, the linkage 75, which is operated by the vertical gyroscope 76, moves the wiper 208 of the up-elevator potentiometer 204 along the resistor 209 thereof. As a result, a signal appears between the wiper 208 and conductor 211 which is connected to the center tap of the resistor 209. The desired portion of this signal is selected by the up-elevator compensation potentiometer 214 and is transmitted through bridge 221 and conductor 226 to amplifier 215 where it operates the servomotor 18 to move the elevator upwardly. The movement of the elevator causes the wiper 286 of rebalancing potentiometer 281 to be repositioned to counteract this signal so that when a balanced condition is reached, the elevator stops moving. As the plane then rolls back to its normal level position, the up-elevator potentiometer signal is reduced and the amplifier 15 drives the servomotor 18 in the opposite direction to return the elevator to its normal position. Different ships will require a different amount of up-elevator for the same amount of bank, and similarly the same ship will require different amounts of up-elevator at different speeds. For this reason we provide the up-elevator compensation potentiometer 214 by which that portion of the total amount of up-elevator signal which is transmitted to the amplifier 15 may be varied.

Considering now what happens when the plane deviates in azimuth, let it be assumed that the plane is blown slightly off course to the right while remaining level. Under these conditions, the azimuth responsive instrument 43 will cause wipers 36, 45, and 117 of potentiometers 32, 44, and 116 to be moved off center, and a first power signal will be developed between wiper 36 and ground, and a second power signal will be developed between wiper 45 and ground. A signal having the desired exponential function is selected by wiper 52 and transmitted through conductor 65, aileron master ratio control potentiometer 61, conductor 66, wiper 74, bridge 21, and conductor 26 to amplifier 13. There the signal will cause the amplifier to operate the servomotor 16 to drive the ailerons to the left and an opposing signal will thereby be developed by the rebalancing potentiometer 81 in the manner previously described. Were this the only action, the ailerons would be moved to the left, and would remain in that position until the ship returned to its original heading. However, so long as the ailerons are displaced from their neutral or streamlined position, the ship will continue to roll about its longitudinal axis, and hence means must be provided to streamline the ailerons when the ship has reached the desired degree of bank. The streamlining signal for the ailerons is provided by the gyroscopically operated potentiometer 72 which, when the plane starts to roll about its longitudinal axis, has its wiper 74 moved with respect to resistor 73 by the vertical gyroscope 76. The deviation of the plane in azimuth therefore causes a movement of the ailerons which would tend to turn the plane in the opposite direction and return it to its original heading; and to counteract the rolling effect of the ailerons thus introduced, the gyroscopically operated potentiometer 72 causes an opposing signal to be generated which streamlines the ailerons and stops further movement of the ship about its longitudinal axis. As the plane returns to its original heading, the wipers 36 and 44 are returned toward their mid-positions. This disturbs the previously balanced condition of the network by reducing the signal from bridge 23 so that the signal from bridge 22 is now the larger. The ailerons are then operated in the opposite direction, causing the ship to return to level flight, with the gyroscopically operated potentiometer 72 again streamlining the ailerons when the plane is level.

When the azimuth responsive instrument 43 causes the wiper 36 to move with respect to resistor 37, the linear signal produced thereby appears at the lower end of resistor 112 of skid potentiometer 110; and a portion of this signal appears on conductor 113, velocity signal control potentiometer 120, and conductor 134. Simultaneously with the movement of wiper 36, block 125 is moved by the linkage 42 which is connected to the azimuth responsive instrument 43. As previously explained, the disc 126 and cylinder 127 cooperate to cause a signal to appear between wiper 117 and the center tap of resistor 118 of the velocity signal potentiometer 116. This signal has a value proportional to the velocity of movement of block 125, and starts and stops substantially simultaneously with the movement of the block. The velocity signal thus produced is applied across the ends of resistor 122 of potentiometer 120 and the desired portion of the signal is selected by wiper 121 and transmitted through conductor 134 to the rudder master ratio control potentiometer 131. The combined signals, consisting of the deviation signal present in conductor 113 and the velocity signal produced by potentiometer 116, are applied to potentiometer 131, and the desired portion thereof is transmitted through bridge 121 and conductor 126 to amplifier 14 where it causes the rudder servomotor 17 to move the rudder so as to turn the ship toward its original heading.

As soon as the ship stops turning away from its original heading, the velocity signal provided by the potentiometer 116 is reduced to zero. Then as the ship starts to return to its original position, a signal of the opposite phase is produced which opposes a portion of the deviation signal from potentiometer 110 and thus the tendency to overshoot is reduced. The action of our automatic pilot is thus similar to that of the human pilot, since a rudder correction is first applied to stop the deviation of the craft and then the correction is reduced as the aircraft returns to its original heading. The rudder rebalancing potentiometer 181 works similarly to the aileron rebalancing potentiometer 81 to maintain the bridge in a balanced condition at all times so that any change in magnitude or phase of the signal is immediately acted upon by the amplifier 14.

When the plane is in a bank as just described, the vertical gyroscope 76 causes the wiper 74 of the gyroscopically operated potentiometer 72 to be moved with respect to resistor 73, and this introduces a signal which tends to streamline the rudder since the normal effect of this potentiometer is to apply rudder correction in the direction opposite to that of the bank. However, it is important that the rudder must not be streamlined under these conditions. If it were, most of the turning effect, which is necessary to return the craft to its original heading, would be lost; and the turn would not be coordinated and would take much longer to complete. The potentiometer 110, known as the "skid" potentiometer, provides a means for adjusting the effect of the gyroscopically operated potentiometer 72 on the rudder network 11. This is done by placing the plane in a turn by moving the wipers 36 and 45 of the potentiometers 32 and 44 to the ends of their respective resistors, and holding them in that position so that the plane continues to turn while the adjustments are being made. When a steady condition is reached, the wiper 111 of the skid potentiometer 110 is adjusted until the turn and bank indicator on the pilot's instrument panel indicates that a coordinated turn is being made. When this has been done, the wiper 111 is then at that position with respect to resistor 112 where the directional signal from potentiometer 32 is sufficiently greater than the signal from the gyroscopically operated potentiometer 72 to provide the proper amount of rudder correction necessary for a coordinated turn.

As the aircraft returns toward its original heading, the wipers 36 and 45 of the potentiometers 32 and 44 will be returned to their center position, and this causes the ailerons to be moved in the opposite direction, thereby causing the plane to level out as it approaches its original heading. The wiper 74 of the gyroscopically operated potentiometer 72 is thus returned to its center position. Hence when the plane is once again on its original course, the wings are level, and the wipers 36, 44, and 74 of potentiometers 32, 44, and 72 are in their center positions.

The effect of the movement of these wipers on the rudder position has been similar to that just described with respect to the ailerons. As the plane is returned towards its original heading, the signal provided by the directional potentiometer 32 is reduced as is the signal provided by the gyroscopically operated potentiometer 72. Thus the signal having the selected proportion of these components which is present in conductor 113 is likewise reduced and the rudder is thus returned to its streamlined position as the plane approaches the proper heading. The potentiometer 116, which provides the velocity signal, is operative during this time and may, if the rate of return of the ship to the desired heading is great enough, actually cause the rudder to be driven in the opposite direction so as to reduce the overshooting and hunting tendency to a minimum.

When the pilot wishes to change the heading of the ship, the normal restoring action of the azimuth responsive instrument must be eliminated. This is done automatically, as previously described, when the pilot turns the knob 106 which moves the wiper 97 of the turn control potentiometer 96 and which simultaneously operates the cam 105 to cause the switch contacts 103 and 104 to operate the disconnecting means 101. Since the wipers 36, 45, and 117 of potentiometers 32, 44, and 116, controlled by the azimuth responsive instrument 43, are in center position and are maintained in this position by the disconnecting means 101, no signal will be introduced into the network from these potentiometers. The movement of wiper 97, however, has caused a signal to be produced by bridge 24 and this signal appears on conductor 66 and also at the lower end of resistor 112 of the skid potentiometer 110. The signal on conductor 66 travels on through the network 10 and to the amplifier 13 where it causes the aileron servomotor to position the ailerons so that the ship is banked, whereupon the action of the vertical gyroscope 76 moves the wiper 74 of the gyroscopically operated potentiometer 72 across its associated resistor 73 and thereby provides an opposing signal which causes the ailerons to be streamlined.

As mentioned, the signal from bridge 24 appears at the lower end of resistor 112 of the skid potentiometer 110 and when this signal is first applied and before the plane has a chance to roll about its longitudinal axis, this same signal passes unchanged from conductor 66 through wiper 74 of the gyroscopically operated potentiometer 72 and then goes to the upper end of resistor 112 so that the entire resistor is raised to a voltage equal to that produced by bridge 24. This voltage signal is transmitted by conductor 113 to the rudder bridge 11 where it goes through conductor 134, master ratio potentiometer 131, conductor 136, bridge 121 and conductor 126 to amplifier 14 to cause the rudder to be repositioned. As the plane starts to roll about its longitudinal axis, the signal generated by bridge 22 opposes the signal generated by bridge 24 so that the voltage at wiper 74 with respect to ground is substantially zero. However, the voltage produced by bridge 24 is still applied to the lower end of resistor 112 of the skid potentiometer 110, and hence a portion of voltage from bridge 24 continues to be applied to the network 11, so that while the ailerons are streamlined in the turn, the rudder is not and the desired coordinated turn results. Since both networks 10 and 11 are thus in balanced condition, the turn will be continued so long as the wiper 97 of the turn control potentiometer 96 remains in its off-center position. When the wiper 97 is returned to center position, a reverse signal will be applied and the ailerons and rudder will be operated to level the plane and resume straight flight. At the same time, cam 105 will permit switch blades 103 and 104 to separate so that the locking means 101 is no longer energized and the wipers 36, 45, and 117 of potentiometers 32, 44, and 116 are thus operatively reconnected to azimuth responsive device 43.

Under all of the conditions just described, the rolling or banking of the plane about its longitudinal axis causes the wiper 208 of the up-elevator potentiometer 204 to be moved with respect to its resistor 209 and thus causes the proper amount of up-elevator to be applied to maintain the ship at the same altitude. Similarly, should there be any deviation of the plane about its pitch axis during any of these operations or maneuvers, wiper 205 of the elevator potentiometer 203 would be displaced from its normal position, and the proper amount of elevator correction applied as previously described.

Under certain conditions, it is necessary that the airplane be flown with extreme accuracy, and that any deviation in azimuth be immediately corrected. To secure such immediate response, all of the deviation and velocity signals developed by the potentiometers 32, 44, and 116 must be transmitted to the respective amplifiers; otherwise, the correction provided by the amplifiers will be too little and too late. In order for the entire deviation signal to be transmitted to the amplifiers, the wipers 62 and 132 of the master ratio control potentiometers 61 and 131 must be at the right hand end of their respective resistors 63 and 133, and since the two wipers are mechanically coupled to a single knob located on the pilot's control panel, the pilot may secure this accurate control whenever desired. However, when such accurate control is not necessary, it is desirable to reduce the magnitude of the deviation and velocity signals since their full utilization produces a somewhat bumpy ride. This roughness will readily be seen to be caused by the constant movement of the control surfaces, correcting for each deviation in heading. If the master ratio control potentiometers 61 and 131 have their wipers returned toward center, the roughness will be greatly reduced if not eliminated altogether, for now the plane may deviate more before a weaker signal is transmitted to the amplifiers. This in turn means a more gradual return to course, and consequently a more pleasant ride.

If the master ratio control is turned so that the wipers 62 and 132 thereof are to the left of center position, all of the exponential signal developed by potentiometers 32 and 44 will be removed from the amplifier 13, and only the signal developed by the gyroscopically operated potentiometer 72 will be available to operate the ailerons. The first order signal developed by potentiometer 32, and the velocity signal developed by potentiometer 116 will be transmitted by conductor 134 to the rudder master ratio potentiometer 131, where only a small portion of the total signal will be sent on to the amplifier 14 to operate the rudder. This means that the wings of the plane will be maintained level, and any course corrections will be secured by "skidding" the plane into position with the rudder. The movement of the rudder under these conditions will be quite reduced, and hence a much smoother, though not so accurate, flight will be had.

With the wipers 62 and 132 of potentiometers 61 and 131 at the mid-positions of their respective resistors, the action of the turn control bridge 24 will not be affected except that the amount of rudder movement for a given movement of knob 106 may be reduced because of the position of wiper 132. However, as the wipers 62 and 132 are moved farther to the left, less of the signal from bridge 24 is transmitted to the amplifier 13, and less of the signal in conductor 134 is transmitted to amplifier 14, and hence the amount of turn possible with the turn control potentiometer 96 is reduced. Because of resistors 64 and 135, this turn cannot be entirely reduced to zero, but it may be greatly decreased.

Because of unequal power settings or unequal distribution of load, it is often necessary to move one or more of the control surfaces from its neutral position in order to make the plane fly straight and level. Under these conditions, the neutral position of the system must be shifted to correspond to the neutral position of the control surfaces, and this may be done by adjusting wipers 83, 183, and 283 of centering potentiometers 82, 182, and 282, respectively.

It will thus be seen that we have provided an improved control system which provides extreme versatility with simplicity of control. In addition, because of the provision for adjustment of the exponential signal and of the velocity signal, the pilot may adjust the control system so that the maximum accuracy of flight may be had. The master ratio control potentiometers 61 and 131 provide means for adjusting the effect of the directional responsive instrument 43, and the pilot may thus provide the smoothest possible flight commensurate with proper flying. While we have shown and described a preferred form of our invention, it is to be understood that modifications thereof are possible, and we do not wish to be limited to the particular form shown except as indicated by the following claims.

We claim as our invention:

1. A control system in which first and second condition controlling means separately control first and second independent conditions, respectively, and are both operated by changes in both of these conditions, the system including: a first motor means adapted to position said first control means; a second motor means adapted to position said second control means; a first means adapted to provide a voltage signal when said first condition changes; a second means adapted to provide a voltage signal when said second condition changes; a first motor control means operating said first motor means in accordance with said signals from said first and second means; a third means adapted to provide a voltage signal in which said voltage signals from said first and second means are combined; and a second motor control means operating said second motor means in accordance with said signal from said third means.

2. A control system for aircraft having a first airfoil surface operable to change the position of the aircraft about its longitudinal axis, and a second airfoil surface operable to change the heading of the aircraft, the control system including: a first motor means for positioning said first airfoil surface; a second motor means for positioning said second airfoil surface; a first means providing a signal upon a deviation of said aircraft about its longitudinal axis; a second means providing a signal upon a deviation of the heading of said aircraft; a first motor control means for operating said first motor means in accordance with the demands of said first and second means; a third means adapted to transmit a signal which includes signals from said first and second means; and a second motor control means for operating said second motor means in accordance with the demands of said third means.

3. A control system for aircraft having first and second airfoil surfaces which may be operated to change the position of the aircraft about its longitudinal and a vertical axis, respectively, and including: a first motor means for positioning said first airfoil surface; a second motor means for positioning said second airfoil surface; a first impedance means for providing a signal when said aircraft deviates about a vertical axis; a second impedance means for providing a signal when said aircraft deviates about its longitudinal axis; a first motor control means for operating said first motor means in accordance with said signals from said first and second impedance means; means adapted to provide a signal in which said signals from said first and second impedance means are combined; and a second motor control means for operating said second motor means in accordance with said signal from said last mentioned means.

4. In combination with an aircraft having a first airfoil surface adapted to control the movement of said craft about its longitudinal axis and a second airfoil surface adapted to control the movement of said craft about a vertical axis: a first motor means adapted to position said first airfoil surface; a second motor means adapted to position said second airfoil surface; a first means adapted to provide a voltage signal when said craft deviates about its longitudinal axis; a second means adapted to provide a voltage signal when said craft deviates about a vertical axis; a first motor control means adapted to control the operation of said first motor means in accordance with the voltage signals from said first and second means; a third means adapted to combine said voltage signals from said first and second means and provide a third voltage signal in which said signals from said first and second means appear in variable proportions; and a second motor control means adapted to control the operation of said second motor means in accordance with said third voltage signal.

5. A control system for aircraft having first and second air foil surfaces which may be operated to change the position of the aircraft about its longitudinal and a vertical axis respectively, and including: a first motor means for positioning said first airfoil surface; a second motor means for positioning said second airfoil surface; a first impedance means for providing a signal when said aircraft deviates about a vertical axis; a second impedance means for providing a signal when said aircraft deviates about its longitudinal axis; a first motor control means for operating said first motor means in accordance with said signals from said first and second impedance means; a variable third impedance means adapted to provide a signal in which said signals from said first and second impedance means are combined, the proportions thereof being adjustable by varying said third impedance; and a second motor control means for operating said second motor means in accordance with said signal from said third impedance means.

6. A control system for aircraft having first and second airfoil surfaces to vary the position of the aircraft about its roll and turn axes respectively, and including: a first motor means for positioning said first airfoil surface; a second motor means for positioning said second air foil surface; an azimuth responsive member; a first impedance means operated by said azimuth responsive member and providing a first signal which varies with the deviation of said aircraft about its turn axis; a member responsive to deviation of said aircraft about its roll axis; a second impedance means operated by said last mentioned member and providing a second signal which varies with the deviation of said aircraft about its roll axis; a first motor control means operating said first motor means in response to said signals from said first and second impedance means; a third impedance means connected to the outputs of said first and said second impedance means and adjustable to provide a third signal in which said first and said second signals appear in variable proportions; a fourth impedance means operated by said azimuth responsive member and providing a fourth signal which varies with the rate of said deviation of said aircraft about its turn axis; and a second motor control means operating said second motor means in response to signals from said third and fourth impedance means.

7. A control system for aircraft having first and second airfoil surfaces to vary the position of the aircraft about its roll and turn axes respectively, and including: a first motor means for positioning said first airfoil surface; a second motor means for positioning said second airfoil surface; an azimuth responsive member; a first impedance means operated by said azimuth responsive member and providing a first signal which varies with the deviation of said aircraft about its turn axis; a member responsive to deviation of said aircraft about its roll axis; a second impedance means operated by said last mentioned member and providing a second signal which varies with the deviation of said aircraft about its roll axis; a first motor control means operating said first motor means in response to signals from said first and said second impedance means; a third impedance means connected to the outputs of said first and said second impedance means and adjustable to provide a third signal in which said first and said second signals appear in variable proportions; a fourth impedance means operated by said azimuth responsive member and providing a fourth signal which varies with the rate of said deviation of said aircraft about its turn axis; a fifth impedance means connected to the output of said fourth impedance means and adjustable to control the magnitude of said fourth signal; and a second motor control means operating said second motor means in response to signals from said third and fifth impedance means.

8. A control system in which first and second condition controlling means separately control first and second independent conditions, respectively, and are both operated by changes in both of these conditions, the system including: a first motor means adapted to position said first control means; a second motor means adapted to position said second control means; a first means adapted to provide a voltage signal when said first condition changes; a second means adapted to provide a voltage signal when said second condition changes, said signal varying with the magnitude and direction of said change; a first motor control means operating said first motor means in accordance with said signals from said first and second means; a third means adapted to provide a voltage signal in which said voltage signals from said first and second means are combined in variable proportions; a fourth means adapted to provide a signal proportional to the rate of change of said second condition; and a second motor control means operating said second motor means in accordance with said signals from said third and fourth means.

9. A control system for aircraft having first and second airfoil surfaces to vary the position of the aircraft about its roll and turn axes respectively, and including: a first motor means for positioning said first airfoil surface; a second motor means for positioning said second airfoil surface; an azimuth responsive member; a first impedance means operated by said azimuth responsive member and providing a first signal which varies linearly with the deviation of said aircraft about its turn axis; a second impedance means operated by said azimuth responsive member and adapted to convert said first signal to a second signal varying as the square of said deviation; a third impedance means connected to the outputs of said first and said second impedance members and adjustable to provide a third signal which varies as an exponential function, whose exponent may have any value between plus one and plus two, of said deviation; a member responsive to deviation of said aircraft about its roll axis; a fourth impedance means operated by said last mentioned member and providing a fourth signal which varies with the deviation of said aircraft about its roll axis; a first motor control means operating said first motor means in response to said signals from said third and said fourth impedance means; a fifth impedance means connected to the outputs of said first and said fourth impedance means and adjustable to provide a fifth signal in which said first and said fourth signals appear in varying proportions; a sixth impedance means operated by said azimuth responsive member and providing a sixth signal which varies with the rate of said deviation of said aircraft about its turn axis; a seventh impedance means connected to the output of said sixth impedance means and adjustable to control the magnitude of said sixth signal; and a second motor control means operating said second motor means in response to signals from said fifth and seventh impedance means.

10. A control apparatus for an aircraft having a first airfoil surface for controlling the roll of said aircraft about its longitudinal axis, a second airfoil surface for controlling the turning of the aircraft about a vertical axis, and first and second motor means for controlling the first and second airfoil surfaces respectively, said control apparatus including: a first impedance means operated upon the deviation of said aircraft about its turn axis and adapted to provide a first power signal thereupon; a second impedance means adapted to convert said first power signal into a second power signal; a third impedance means adjustable to transmit said first power signal, said second power signal or a signal intermediate between said first and second power signals; a fourth impedance means operated upon the deviation of said aircraft about its roll axis and adapted to provide a signal thereupon; a first impedance network including said first, second, third, and fourth impedance means; a first motor control means adapted to control said first motor means in accordance with signals developed by said first impedance network; a fifth impedance means adjustable to transmit said first order signal, or said signal from said fourth impedance means, or a signal combining said last two signals; a second impedance network including said first, fourth, and fifth impedances; and a second motor control means adapted to control said second motor means in accordance with signals developed by said second impedance network.

11. A rebalancing control system for aircraft having first and second airfoil surfaces for control of movement of the aircraft about its roll and turn axes, the system including: first motor means for positioning said first airfoil surface; second motor means for positioning said second airfoil surface; first impedance means operated by an azimuth responsive member to provide a signal when said aircraft moves about its turn axis; a second impedance means operated to provide a signal when said aircraft moves about its roll axis; a first source of power; a first centering impedance connected to said first source of power; a first rebalancing impedance connected to said first centering impedance and operated by said first motor means; a first ratio impedance interposed between said source of power and said first rebalancing impedance; a first network including said first and second impedance means, said first centering impedance, said first rebalancing impedance; and said first ratio impedance; a first motor control means controlling the operation of said first motor means in response to signals from said first network; a third impedance means connected to said first and second impedance means and adjustable to provide a signal in which their signals appear in predetermined proportions; a second source of power; a second centering means connected to said second source of power; a second rebalancing impedance connected to said second centering impedance and operated by said second motor means; a second ratio impedance interposed between said second source of power and said second rebalancing impedance; a second network including said third impedance means, said second centering impedance, said second rebalancing impedance, and said second ratio impedance; and a second motor control means controlling the operation of said second motor means in response to signals from said second network, said first and second ratio means determining the amount of movement of said first and second airfoil members respectively for a given signal from said first and second networks.

12. A rebalancing control system for aircraft having first and second airfoil surfaces for control of movement of the aircraft about its roll and turn axes, the system including: first motor means for positioning said first airfoil surface; second motor means for positioning said second airfoil surface; first impedance means operated by an azimuth responsive member to provide a signal varying with the amount of movement of said aircraft about its turn axis; a second impedance means operated to provide a signal when said aircraft moves about its roll axis; a first source of power; a first centering impedance connected to said first source of power; a first rebalancing impedance connected to said first centering impedance and operated by said first motor means; a first ratio impedance interposed between said source of power and said first rebalancing impedance; a first network including said first and second impedance means, said first centering impedance, said first rebalancing impedance and said first ratio impedance; a first motor control means controlling the operation of said first motor means in response to signals from said first network; a third impedance means connected to said first and second impedance means and adjustable to provide a signal in which their signals appear in predetermined proportions; a second source of power; a fourth impedance means operated by said azimuth responsive member to provide a signal varying with the rate of movement of said aircraft about its turn axis; a second centering means connected to said second source of power; a second rebalancing impedance connected to said second centering impedance and operated by said second motor means; a second ratio impedance interposed between said second source of power and said second rebalancing impedance; a second network including said third impedance means, said fourth impedance means, said second centering impedance, said second rebalancing impedance, and said second ratio impedance; and a second motor control means controlling the operation of said second motor means in response to signals from said second network, said first and second ratio means determining the amount of movement of said first and second airfoil members respectively for a given signal from said first and second networks.

13. A rebalancing control system for aircraft having first and second airfoil surfaces for control of movement of the aircraft about its roll and turn axes, the system including: first motor means for positioning said first airfoil surface; second motor means for positioning said second airfoil surface; first impedance means operated upon the deviation of said aircraft about its turn axis and adapted to provide a first power signal thereupon; a second impedance means adapted to convert said first power signal into a second power signal; a third impedance means adjustable to transmit said first power signal, said second power signal, or a signal intermediate between said first and second power signals; a fourth impedance means operated to provide a signal when said aircraft moves about its roll axis; a first source of power; a first centering impedance connected to said first source of power; a first rebalancing impedance connected to said first centering impedance and operated by said first motor means; a first ratio impedance interposed between said source of power and said first rebalancing impedance; a first network including said first, second, third and fourth impedance means, said first centering impedance, said first rebalancing impedance and said first ratio impedance; a first motor control means controlling the operation of said first motor means in response to signals from said first network; a fifth impedance means connected to said first and fourth impedance means and adjustable to provide a signal in which their signals appear in predetermined proportions; a second source of power; a second centering means connected to said second source of power; a second rebalancing impedance connected to said second centering impedance and operated by said second motor means; a second ratio impedance interposed between said second source of power and said second rebalancing impedance; a second network including said fifth impedance means, said second centering impedance, said second rebalancing impedance, and said second ratio impedance; and a second motor control means controlling the operation of said second motor means in response to signals from said second network, said first and second ratio means determining the amount of movement of said first and second airfoil members respectively for a given signal from said first and second networks.

14. In an apparatus for controlling an aircraft having a first airfoil surface for controlling the roll of said aircraft about its longitudinal axis and a second airfoil surface for controlling the direction of flight, and first and second motors for controlling the first and second airfoil surfaces, respectively; means including an impedance network of the follow-up type for controlling said first motor, said impedance network including a first impedance means responsive to the extent of deviation of said aircraft about its longitudinal axis from a predetermined attitude, second and third variable impedance means each variable simultaneously in accordance with the deviation of said aircraft from a predetermined direction of flight, and a fourth impedance means adapted to be positioned by said first motor for rebalancing said system, said second and third impedance means being connected into said imedance network so as to introduce into said network an impedance effect varying as an exponential function greater than one of the extent of the deviation of said aircraft from said predetermined direction of flight, means including a second impedance network for controlling said second motor, said means including said first named impedance and an adjustable portion of said second and third impedance means of said previously described network, velocity responsive impedance means responsive to the velocity of deviation of said aircraft from said predetermined direction of flight, and follow up impedance means adapted to be positioned by said second motor so as to rebalance said last named network, each of said first and second motor controlling means including voltage responsive means responsive to the voltage existing across said entire network, and means for varying the effect of the follow up impedance means associated with said network, said last named means including an adjustable impedance element interposed between said follow up impedance and said voltage responsive means.

15. Control apparatus for an aircraft having a control surface comprising; means for operating said control surface; control means for said operating means, signal combining means for operating said control means including a one phase signal providing controller responsive to deviations of the aircraft about one axis, a second opposite phase signal providing controller responsive to deviations of said aircraft about a second axis, and a device for transmitting a signal derived from said two controller signals; and means for adjusting said device to concurrently oppositely vary the effect of said controller on said control means.

16. In a control apparatus for an aircraft having a first control surface for controlling the aircraft about a first axis and a second control surface for controlling the aircraft about a second axis; operating means for each control surface; a separate control means for each said operating means, each control means including a means responsive to deviations of said aircraft about said first axis and a means responsive to deviations of said aircraft about said second axis, means for decreasing the effect of one deviation responsive means in one control means while increasing the effect therein of said second deviation means; and means responsive to the rate of movement about said second axis included in said one control means.

17. In a control apparatus for an aircraft having two control surfaces, one control surface controlling the aircraft about one axis, the other control surface controlling the aircraft about a second axis: operating means for each control surface; a control means for both operating means including a controller having a signal of one phase responsive to deviation about the vertical axis for initiating operation of said operating means and a deviation responsive means for providing a signal of opposite phase operated on movement about the roll axis for opposing the effect of said deviation controller means on said control means; and means for oppositely varying the effects of both said deviation responsive means through said control means on one operating means.

18. In a control apparatus for an aircraft having two control surfaces, one control surface controlling the aircraft about one axis, the other control surface controlling the aircraft about a second axis: operating means for said control surfaces; a first control means for one operating means including a first controller responsive to the deviations of the aircraft about one axis and a second controller responsive to the deviations of the aircraft about a second axis; a second control means for the other operating means including said first controller and second controller; means for variably reducing the effect of the second controller in the first control means whereby for deviations operating on the second controller one or both control surfaces may be operated, and for deviations operating said first controller both control surfaces may be operated.

19. Control apparatus for an aircraft having a first control surface for controlling the aircraft about the roll axis and a second control surface for controlling the aircraft about the vertical axis comprising: an operating means for said first surface; an operating means for said second surface; a first electrical signal producing means responsive to movement of the craft about the roll axis; a second electrical signal producing means responsive to movement of the craft about the vertical axis; a manually operable third electrical signal producing means; a fourth electrical signal producing means responsive to the rate of turn of the craft about the vertical axis; a control means for said first operating means; a control means for said second operating means; signal combining means for operating said first control means from said first, second, and third signal producing means; signal combining means for operating said second control means from said first, second and fourth signal producing means; and further means for rendering said second producing means ineffective in said first combining means and for rendering said first producing means ineffective in said second combining means.

20. Control apparatus for an aircraft comprising: means responsive to deviation of said craft about an axis; power means for controlling said craft about said axis; a series circuit for combining voltages comprising a deviation means resistor, a follow up resistor, and deviation and follow up contacts engaging said resistors; operating connections from said deviation means and said power means to said deviation and follow up contacts respectively; means for supplying a voltage across said resistors; voltage dividing means connected across one contact and a point having a potential equal to that of the midpoint of said voltage supply, and control means for said power means connected to the voltage dividing means and the remaining contact.

21. Control apparatus for an aircraft having first and second control surfaces for controlling said craft about the roll and vertical axes comprising: power means for said first surface; power means for said second surface; means responsive to deviation of said craft about said roll axis; a first potentiometer operated by said deviation means; a second manually operated potentiometer; control means for said first power means including said first and second potentiometers; a voltage divider connected across said first potentiometer; and control means for said second power means including said second potentiometer and said voltage divider.

22. Control apparatus for an aircraft having first and second control surfaces for controlling said craft about the roll and vertical axes, said apparatus comprising: power means for operating one control surface; power means for operating the other control surface; tilt responsive means for detecting movements of the craft about its roll axis; a signal voltage generator operated by said responsive means; a turn initiating signal voltage generator; a first control means for said first power means operated by said turn initiating signal voltage; a follow-up device driven by said first power means for modifying said initiating signal to limit operation of said first control means; means for connecting said roll signal voltage to said control means to oppose said turn initiating voltage; a second control means for said second power means; a voltage adjusting means connecting said tilt responsive generator and said turn initiating generator in opposing relation to said second control means for varying the proportions of the tilt generated voltage supplied to said first and second control means; and a follow-up device driven by said second power means for modifying operation of said second control means by said adjusted tilt voltage and said turn initiating voltage.

23. Coordinated flight control means for an aircraft, comprising rudder and aileron servomotors, a rudder follow-up electrical signal developing device operably associated with said rudder servomotor, an aileron follow-up electrical signal developing device operably associated with said aileron servomotor, reference means responsive to craft displacement from a prescribed heading, a single heading displacement electrical signal developing device operably associated with said reference means, a second reference means responsive to the craft rate of turn, a rate of turn electrical signal device operably associated with said rate of turn reference, electrical means connecting the heading displacement signal developing device in series with the aileron follow-up signal developing device to said aileron servomotor, and electrical means also connecting the heading signal developing device, the rate of turn signal developing device, and the rudder follow-up signal developing device in series for operating said rudder servomotor whereby said aileron servomotor and said rudder servomotor are connected by electrical means so that the same heading displacement signal is sent to both motors.

24. Control apparatus for an aircraft having a first control surface for controlling the aircraft about the roll axis and a second control surface for controlling the aircraft about the vertical axis comprising: an operating means for said first surface; an operating means for said second surface; an electrical roll attitude signal producing means responsive to movement of the craft about the roll axis; a single electrical displacement signal generator responsive to movement of the craft about the vertical axis; a manually operable electrical signal producing means; an electrical rate signal producing means responsive to the rate of turn of the craft about the vertical axis; a control means for said first operating means; a control means for said second operating means; signal combining means for operating said first control means from said roll attitude and manually operable signal producing means and said single displacement signal generator; a signal combining means for operating said second control means from said single displacement signal generator; and said rate signal producing means; and means for preventing operation of said single displacement signal generator while said manually operable signal means is producing a signal to change the heading of said craft.

25. Control apparatus for an aircraft having a first control surface for controlling the aircraft about the roll axis and a second control surface for controlling the aircraft about the vertical axis comprising: an operating means for said first surface; an operating means for said second surface; a single electrical roll attitude signal generator responsive to movement of the craft about the roll axis; an electrical displacement signal producing means responsive to movement of the craft about the vertical axis; a manually operable electrical signal producing means; an electrical rate signal producing means responsive to the rate of turn of the craft about the vertical axis; a control means for said first operating means; a control means for said second operating means; signal combining means for operating said first control means from said roll attitude signal generator and said manually operable signal producing means; a signal combining means for operating said second control means from said single roll attitude signal generator and said displacement signal and said rate signal producing means; and means for preventing operation of said displacement signal producing means while said manually operable signal means is producing a signal to change the heading of said craft.

26. Flight control means for an aircraft comprising: a first servomotor for controlling angular movement of the craft about its roll axis; the second servomotor for controlling angular movement of the craft about its vertical axis; a first follow-up electrical signal developing device operated by said first servomotor; a second follow-up electrical signal developing device operated by said second servomotor; reference means responsive to craft displacement from a prescribed heading; a single heading displacement electrical signal developing device operated by said reference means; a second reference means responsive to the craft rate of turn; a rate of turn electrical signal device operated by said rate of turn reference; electrical means connecting the heading displacement signal developing device in series with the first follow-up signal developing device to said first servomotor; and electrical means also connecting the heading signal developing device, the rate of turn signal developing device, and the second follow-up signal developing device in series for operating said second servomotor whereby said first servomotor and said second servomotor are connected by electrical means so that the same heading displacement signal controls both servomotors.

27. Flight control means for a dirigible craft having a first servomotor for controlling movement of the craft about its normally vertical axis and a second servomotor for controlling angular movement of the craft about its roll axis, said apparatus comprising: a first follow-up electrical signal developing device operated by said first servomotor; a second follow-up electrical signal developing device operated by said second servomotor; reference means responsive to craft displacement from a prescribed heading; a single heading displacement electrical signal developing device operated by said reference means; a second reference means responsive to the craft rate of turn; a rate of turn electrical signal developing device operated by said rate of turn reference; a balanceable electrical means connecting the heading displacement signal developing device and the second follow-up signal developing device to said second servomotor; and a further balanceable electrical means also connecting the heading signal developing device, the rate of turn signal developing device, and the first follow-up signal developing device to said first servomotor whereby said second servomotor and said first servomotor are connected by electrical means so that the same heading displacement signal is sent to both servomotors.

References Cited in the file of this patent

UNITED STATES PATENTS

| | | |
|---|---|---|
| 1,869,840 | Boykow | Aug. 2, 1932 |
| 1,966,170 | Greene | July 10, 1934 |
| 2,003,024 | West | May 28, 1935 |
| 2,084,509 | Seidelbach | June 22, 1937 |
| 2,371,388 | Glenny | Mar. 13, 1945 |
| 2,371,732 | Bristol | Mar. 20, 1945 |
| 2,387,795 | Isserstedt | Oct. 30, 1945 |
| 2,390,793 | Jones | Dec. 11, 1945 |
| 2,415,430 | Frische et al. | Feb. 11, 1947 |
| 2,416,097 | Hansen et al. | Feb. 18, 1947 |
| 2,423,336 | Moseley | July 1, 1947 |
| 2,464,629 | Young | Mar. 15, 1949 |
| 2,571,106 | Brannin | Oct. 16, 1951 |